(12) United States Patent
Meldahl et al.

(10) Patent No.: US 8,498,176 B2
(45) Date of Patent: *Jul. 30, 2013

(54) SEISMIC EXPLORATION

(75) Inventors: Paul Meldahl, Forus (NO); Eiolf Vikhagen, Trondheim (NO)

(73) Assignee: Statoil ASA, Stavanger (NO)

( * ) Notice: Subject to any disclaimer, the term of this patent is extended or adjusted under 35 U.S.C. 154(b) by 844 days.

This patent is subject to a terminal disclaimer.

(21) Appl. No.: 11/990,558

(22) PCT Filed: Aug. 11, 2006

(86) PCT No.: PCT/GB2006/003000
§ 371 (c)(1), (2), (4) Date: Feb. 4, 2009

(87) PCT Pub. No.: WO2007/020396
PCT Pub. Date: Feb. 22, 2007

(65) Prior Publication Data
US 2009/0128800 A1    May 21, 2009

(30) Foreign Application Priority Data
Aug. 15, 2005    (GB) .................... 0516720.0

(51) Int. Cl.
G01V 1/38    (2006.01)
G01P 3/36    (2006.01)
G01B 9/02    (2006.01)

(52) U.S. Cl.
USPC ............................ 367/15; 356/28.5; 356/450

(58) Field of Classification Search
USPC .................. 356/28, 28.5, 302, 341, 486, 498, 356/614; 367/14, 15, 149
See application file for complete search history.

(56) References Cited

U.S. PATENT DOCUMENTS

| | | |
|---|---|---|
| 3,275,097 A | 9/1966 | Pavey, Jr. |
| 3,711,200 A | 1/1973 | Maughmer |
| 3,804,521 A | 4/1974 | Sprague |
| 4,311,383 A | 1/1982 | Ohtsubo |
| 4,470,696 A | 9/1984 | Ballard |
| 4,576,479 A | 3/1986 | Downs |
| 4,583,095 A | 4/1986 | Peterson |
| 4,843,597 A | 6/1989 | Gjessing et al. |

(Continued)

FOREIGN PATENT DOCUMENTS

| | | |
|---|---|---|
| DE | 3430820 | 3/1986 |
| DE | 4004228 | 8/1991 |

(Continued)

OTHER PUBLICATIONS

Artman, Brad, "Imaging passive seismic data," *Geophysics*, vol. 71, No. 4, pp. SI177-SI187, SP-002479903 (Jul.-Aug. 2006).

(Continued)

*Primary Examiner* — Isam Alsomiri
*Assistant Examiner* — Daniel L Murphy
(74) *Attorney, Agent, or Firm* — Patterson Thuente Pedersen, P.A.

(57) ABSTRACT

A method and apparatus for carrying out a seismic exploration. A seismic event is applied to the earth's surface, particles at the earth's surface move in response to the event and the response to the event is detected using an interferometer. The earth's surface and the interferometer move with respect to each other. The detectors of the interferometer may be arranged in an array. The detected response may be analyze.

52 Claims, 10 Drawing Sheets

U.S. PATENT DOCUMENTS

| | | | |
|---|---|---|---|
| 4,862,422 A | 8/1989 | Brac |
| 4,942,557 A | 7/1990 | Seriff |
| 4,992,995 A | 2/1991 | Favret |
| 5,018,862 A | 5/1991 | Aiello |
| 5,029,023 A | 7/1991 | Bearden et al. |
| 5,070,483 A | 12/1991 | Berni |
| 5,109,362 A | 4/1992 | Berni |
| 5,144,588 A | 9/1992 | Johnston et al. |
| 5,159,406 A | 10/1992 | Adler et al. |
| 5,317,383 A | 5/1994 | Berni |
| 5,477,324 A | 12/1995 | Berthelot et al. |
| 5,493,398 A | 2/1996 | Pfister |
| 5,570,321 A | 10/1996 | Bernitsas |
| 5,587,785 A | 12/1996 | Kato et al. |
| 5,623,307 A | 4/1997 | Kotidis et al. |
| 5,724,309 A | 3/1998 | Higgs |
| 5,783,752 A | 7/1998 | Thorburn et al. |
| 5,892,732 A | 4/1999 | Gersztenkorn et al. |
| 5,907,404 A | 5/1999 | Marron et al. |
| 5,940,777 A | 8/1999 | Keskes |
| 5,987,388 A | 11/1999 | Crawford et al. |
| 6,011,557 A | 1/2000 | Keskes et al. |
| 6,011,753 A | 1/2000 | Chien |
| 6,028,817 A | 2/2000 | Ambs |
| 6,049,760 A | 4/2000 | Scott |
| 6,081,481 A | 6/2000 | Sabatier et al. |
| 6,115,127 A | 9/2000 | Brodeur et al. |
| 6,134,966 A | 10/2000 | Donskoy et al. |
| 6,141,440 A | 10/2000 | Melen |
| 6,188,482 B1 | 2/2001 | Cloud |
| 6,277,075 B1 | 8/2001 | Torp et al. |
| 6,301,193 B1 | 10/2001 | Martin et al. |
| 6,456,565 B1 | 9/2002 | Grall et al. |
| 6,473,695 B1 | 10/2002 | Chutov et al. |
| 6,642,506 B1 | 11/2003 | Nahum et al. |
| 6,725,163 B1 | 4/2004 | Trappe et al. |
| 6,735,526 B1 | 5/2004 | Meldahl et al. |
| 6,788,618 B2 | 9/2004 | Clayton et al. |
| 6,873,571 B2 | 3/2005 | Clayton et al. |
| 7,110,120 B2 | 9/2006 | Shigeki et al. |
| 7,116,427 B2 | 10/2006 | Baney et al. |
| 7,242,481 B2 | 7/2007 | Shpantzer et al. |
| 7,317,538 B2 | 1/2008 | Wada et al. |
| 7,423,279 B2 | 9/2008 | Heinz et al. |
| 7,463,549 B2 | 12/2008 | Naess |
| 7,583,387 B2 | 9/2009 | Meldahl et al. |
| 7,619,744 B2 | 11/2009 | Liess |
| 7,660,188 B2 * | 2/2010 | Meldahl ..................... 367/14 |
| 7,703,535 B2 | 4/2010 | Benson |
| 7,708,695 B2 | 5/2010 | Akkermans et al. |
| 7,720,609 B2 | 5/2010 | Meldahl |
| 7,721,807 B2 | 5/2010 | Stoisits et al. |
| 7,793,724 B2 | 9/2010 | Daniel et al. |
| 7,933,003 B2 * | 4/2011 | Meldahl et al. ............. 356/28.5 |
| 7,958,938 B2 | 6/2011 | Crossley et al. |
| 7,992,632 B2 | 8/2011 | Bornes et al. |
| 8,033,336 B2 | 10/2011 | Benson |
| 8,089,390 B2 | 1/2012 | Jones et al. |
| 2004/0015296 A1 | 1/2004 | Causse et al. |
| 2004/0022125 A1 | 2/2004 | Clayton et al. |
| 2004/0228214 A1 | 11/2004 | Tulett |
| 2004/0262008 A1 | 12/2004 | Deans et al. |
| 2005/0288862 A1 | 12/2005 | Rode et al. |
| 2006/0098529 A1 | 5/2006 | Anderson et al. |
| 2006/0175062 A1 | 8/2006 | Benson |
| 2006/0285437 A1 | 12/2006 | Sinha et al. |
| 2007/0075708 A1 | 4/2007 | Reddig et al. |
| 2008/0288173 A1 | 11/2008 | Saenger |
| 2008/0316496 A1 | 12/2008 | Meldahl et al. |
| 2009/0025480 A1 | 1/2009 | Aharoni |
| 2009/0204330 A1 | 8/2009 | Thomsen et al. |
| 2010/0128561 A1 | 5/2010 | Meldahl et al. |
| 2010/0171501 A1 | 7/2010 | Alumbaugh et al. |
| 2010/0332139 A1 | 12/2010 | Bruun et al. |
| 2011/0046885 A1 | 2/2011 | Bussat et al. |
| 2011/0085420 A1 | 4/2011 | Bussat et al. |
| 2011/0102806 A1 | 5/2011 | Meldahl et al. |

FOREIGN PATENT DOCUMENTS

| | | |
|---|---|---|
| DE | 4213638 | 10/1993 |
| EP | 0018053 | 4/1980 |
| EP | 1001249 | 5/2000 |
| EP | 1403662 | 9/2003 |
| EP | 1879052 | 1/2008 |
| FR | 2765344 | 12/1998 |
| GB | 673971 | 6/1952 |
| GB | 2001021 | 1/1979 |
| GB | 2243968 | 11/1991 |
| GB | 2299108 | 9/1996 |
| GB | 2331971 | 6/1999 |
| GB | 2331971 | 11/1999 |
| GB | 2342081 | 4/2000 |
| GB | 2347744 | 9/2000 |
| GB | 2364388 | 1/2002 |
| GB | 2 410 635 | 8/2005 |
| GB | 2410635 | 8/2005 |
| GB | 2411001 | 8/2005 |
| GB | 2 416 835 | 8/2006 |
| GB | 2454745 | 5/2009 |
| GB | 2460170 | 11/2009 |
| JP | 59162405 | 9/1984 |
| JP | 2002286408 | 10/2002 |
| JP | 2005275540 | 10/2005 |
| JP | 2006-118989 | 5/2006 |
| RU | 9533 | 1/1900 |
| RU | 2072534 | 1/1997 |
| RU | 2121133 | 10/1998 |
| RU | 2246122 | 2/2005 |
| SU | 1728825 | 4/1992 |
| WO | WO 91/13373 | 9/1991 |
| WO | WO9618116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO02/072999 | 9/2002 |
| WO | WO 02/073241 | 9/2002 |
| WO | WO 2004/003589 | 1/2004 |
| WO | WO2004003339 | 1/2004 |
| WO | WO 2004/044617 | 5/2004 |
| WO | WO 2005/078479 | 8/2005 |
| WO | WO2005/078479 | 8/2005 |
| WO | WO 2006/011826 | 2/2006 |
| WO | WO2006/013358 | 2/2006 |
| WO | WO2007/020396 | 2/2007 |
| WO | WO 2007/141725 | 12/2007 |
| WO | WO2009042319 | 4/2009 |

OTHER PUBLICATIONS

Berni, "Remote sensing of seismic vibrations by laser Doppler interferometry" Geophysics. vol. 59, No. 12. pp. 1856-1867. Dec. 1994.

Castagna, John P., et al., "Instantaneous spectral analysis: Detection of frequency shadows associated with hydrocarbons," *The Leading Edge*, XP-002461160, pp. 120-127 (Feb. 2003).

Daneshvar, M. Reza, et al., "Passive seismic imaging using microearthquakes," *Geophysics*, vol. 60, No. 4, pp. 1178-1186 (Jul.-Aug. 1995).

Hohl, Detlef, et al., "Passive Seismic Reflectivity Imaging with Ocean-Botton Cable Data," *SEG/New Orleans 2006 Annual Meeting*, XP-002-156524343, pp. 1560 (2006).

Meldahl et al., Identifying Faults and Gas Chimneys Using Multiattributes and Neural Networks, May 2001. The Leading Edge, pp. 474-482.

Wood et al., "Decreased Stability of Methane Hydrates in Marine Sediments Owing to Phase-Boundry Roughness" Dec. 12, 2002. Nature, vol. 420. pp. 656-660.

International Search Report—PCT/GB2005/000075 dated Mar. 2, 2006 and GB 0500484.1 dated Apr. 12, 2006.

International Search Report—PCT/GB2007/004348 dated Feb. 27, 2009 and Search Report GB 0622697.1 dated Feb. 16, 2007.

International Search Report—PCT/GB2008/004243 dated May 7, 2009.

International Search Report—PCT/GB99/03039 dated Jan. 12, 2000.
Preliminary Examination Report—PCT/GB99/03039 dated Oct. 10, 2000.
International Search Report—PCT/GB2008/051223 dated Apr. 29, 2010.
Application and File History of U.S. Patent No. 6,735,526 issued May 11, 2004, Inventors Meldahl et al.
Application and File History of U.S. Patent No. 7,463,549 issued Dec. 9, 2008, Inventors Naess.
Application and File History of U.S. Patent No. 7,660,188 issued Feb. 9, 2010 Inventors Meldahl et al.
Application and File History of U.S. Patent No. 7,720,609 issued May 18, 2010, Inventors Meldahl.
Application and File History of U.S. Appl. No. 61/321,670, filed Apr. 7, 2010. Inventors Amundsen.
Application and File History of U.S. Appl. No. 12/743,338, filed May 17, 2010. Inventors Torstein.
Application and File History of U.S. Appl. No. 12/789,570, filed May 28, 2010. Inventors Stenevik.
Application and File History of U.S. Appl. No. 12/809,335, filed Jun. 18, 2010. Inventors Bussat.
Application and File History of U.S. Appl. No. 12/809,467, filed Jun. 18, 2010. Inventors Bussat.
Application and File History of U.S. Publication No. 2010/0128561 published May 27, 2010 Inventors Meldahl.
Agneni et al., Image Processing for Fringe Underwrapping in Speckle Interferometry, Proceedings of the SPIE, SPIE, Bellingham, VA 4062: 1479-1484 (2000).
International Search Report for PCT/GB2005/003038 dated Nov. 4, 2005 and Great Britain Search Report for GB 0417370.4 dated Sep. 22, 2005.
International Search Report for PCT/GB2009/000523 dated May 13, 2009 and Great Britain Search Report for GB0903235.0 dated Apr. 23, 2009.
Application and File History for U.S. Appl. No. 12/920,273, filed Dec. 7, 2010, inventor Meldahl et al.
Application and File History for U.S. Appl. No. 11/659,383, filed May 29, 2007, inventor Meldahl.
Written Opinion and International Search Report from International Application No. PCT/EP2010/057403 dated Jul. 13, 2011.
Invitation to pay Additional Fees and Partial ISR from International Application No. PCT/EP2011/055140 dated May 30, 2012.
GB Search Report from GB Application No. 1005574.7 dated Jul. 21, 2010.
GB Search Report for GB Application No. GB0803701.2 dated Jun. 25, 2008.
Bensen et al., Processing Seismic Ambient Noise Data to Obtain reliable Broad-band surface wave dispersion measurements, Jul. 28, 2006. 1239-1260.
Wood et al., Deceased Stability of Methane Hydrates in Marine Sediments Owing to Phase-Boundry Roughness, Dec. 12, 2002, Nature. vol. 420. pp. 656-660.
Application and File History for U.S. Appl. No. 12/514,963, filed Feb. 1, 2010, inventor Meldahl.

* cited by examiner

SEISMIC EXPLORATION

RELATED APPLICATIONS

This application claims priority to PCT Application No. PCT/GB2006/003000, filed Aug. 11, 2006, and Great Britain Application No. 0516720.0. filed Aug. 15, 2005, the disclosures of which are hereby incorporated herein by reference in their entirety.

FIELD OF THE INVENTION

The present invention relates to seismic exploration techniques and the seismic imaging of subsurface layers. It is particularly but not exclusively concerned with submarine seismic exploration and with producing seismic survey reports of subsea geological structures, however it is also applicable to land applications, particularly in difficult terrains.

BACKGROUND OF THE INVENTION

Conventional seismic methods for exploring subterranean strata beneath the seabed involve generating a seismic wave and measuring the response. The seismic wave may be simple or complex and may be generated at sea level, beneath the surface of the water or at the seabed. The response is detected by a series of spaced receivers which are commonly positioned on cables towed behind an exploration vessel. Generally, the receivers are held stationary for the detection step and are then moved to a different location and the process is repeated.

The response to a seismic event in the solid rock at the sea floor includes a compression wave (P-wave) and a shear wave (S-wave). P-waves are considered well suited to imaging structures while the combination of S-waves is well suited to determining rock and fluid characteristics. P-waves travel through rock and sea water while S-waves travel through rock only. Thus, if the receivers are hydrophones floating at or beneath the surface, they will detect only the P-waves. In order to detect the S-waves, it is necessary to use geophones located at the seabed.

Problems also exist on land when the terrain is not conducive to the deployment of receivers, possibly due to desert conditions, mountainous areas, tundra or other extreme conditions.

It has also been recognised that better seismic imaging can be achieved by making use of both P- and S-waves. However, the costs involved in positioning and re-positioning geophones on the sea bed in addition to the use of hydrophones, or in difficult land areas, has been found to be prohibitively costly. This is particularly so since in order to detect S-waves effectively, three independent orthogonal geophones are required at each recording location.

It has been known for more than 10 years that 4C seismic imaging of the subsurface in marine applications may add more and better information to exploration due to high quality recording of shear waves (S-waves) at the water bottom. Unfortunately, 4C-imaging did not become the success that was expected, primarily due to the combination of extreme high acquisition cost and uncertainties in the prediction of payback. The cost factor is related to capacity problems in available acquisition techniques.

4C recording is normally carried out by a hydrophone and three independent orthogonal geophones. The geophones are coupled to the sea bottom and they are therefore sensitive to the particle velocities generated by both the seismic p-waves and the s-waves. These techniques use either sensor cables at the sea bottom or geophone nodes resting on or planted in the sea bottom. 4C seismic acquisition consists of a sequence of moving source and moving receiver operations. After an independent source vessel has carried out a series of shooting profiles, the bottom equipment has to be moved into the next position. Both due to this static recording component in the acquisition and due to a limited number of available receivers, these 4C acquisition systems become ineffective. Due to physical problems both related to moving the heavy equipment along the water bottom and geophone coupling, the reliability is adversely affected.

Finally, it is also recognised that the cost effectiveness of carrying out such seismic imaging, and in particular S-wave measurements, could be greatly reduced by avoiding the need to locate detection apparatus at the seabed, that is to measure an S-wave from a position spaced from the seabed and so allow effective re-positioning of the detection apparatus with respect to the seabed. This applies also to seismic imaging in difficult land terrains.

However, as mentioned, S-waves do not travel through sea water, nor through the atmosphere, making direct sensing remote from the seabed or land surface impossible. Remote sensing has further inherent problems in that the detection apparatus is subjected to ocean currents or atmospheric conditions which can inhibit effective positioning of the detection apparatus, and introduce noise into measurements, making correlation of the results very difficult.

SUMMARY OF THE INVENTION

It is therefore an object of the invention to provide a method of seismic exploration in which both P-waves and S-waves are detected but which is simpler and less costly than known techniques.

According to one aspect of the invention, there is provided a method of seismic exploration which comprises: generating a seismic event; applying the seismic event to the earth's surface; detecting a response to the event, using an interferometer, in which there is relative motion between the earth's surface and the interferometer, the detected response including P-waves and S-waves in the earth's surface; and analysing the detected response; and in which: the detecting step comprises monitoring and recording the response to the seismic event in the form of movements of particles at the earth's surface, from a position spaced from the earth's surface, the detecting step being carried out over a response period, the response period being a predetermined period of time after the seismic event; and the analysing step comprises analysing the movements of particles at the earth's surface in the recorded response to the seismic event during the response period; the said relative motion having a total velocity $V_{tot}$ which includes a transversal or traversing component $V_t$ and a longitudinal component $V_1$; operation of the interferometer including: directing an object beam of coherent light to a measuring position at the earth's surface, whereby there is relative motion between the surface and the measurement position; arranging an array of detectors on the interferometer in a line extending generally in the transversal direction, the detectors being arranged to detect light rays with different angular directions, representing different sensitivity directions; producing a reference beam of coherent light which is at least partly coherent with the object beam; combining the reference beam with the reflected object beam from the surface to produce a cross interference in the speckle pattern providing information about the relative motion of the surface and the interferometer; detecting the speckle pattern and the cross interference pattern with the detectors; determining which detector in the array has zero or minimum sensitivity to the total velocity $V_{tot}$ of the motion, thereby identifying the detector with a sensitivity direction line that is normal to $V_{tot}$; monitoring the temporal change in which of the detectors has zero or minimum sensitivity, thereby ascertaining the change in direction of $V_{tot}$ over time, brought about by changes in $V_1$; and determining temporal changes in $V_1$.

According to another aspect of the invention, there is provided apparatus for carrying out seismic exploration which comprises: means for generating a seismic event; means for applying the seismic event to the earth's surface; an interferometer for detecting a response to the event including P-waves and S-waves in the earth's surface where there is relative motion between the earth's surface and the interferometer; and means for analysing the detected response; and in which: the interferometer is arranged to monitor and record the response to the seismic event in the form of movements of particles at the earth's surface, from a position spaced from the earth's surface, over a predetermined response period after the seismic event; the said relative motion having a total velocity $V_{tot}$ which includes a transversal or traversing component $V_t$ and a longitudinal component $V_1$, the interferometer comprising: means for directing an object beam of coherent light to a measurement position at the earth's surface, whereby there is relative motion between the surface and the measurement position; an array of detectors on the interferometer arranged in a line extending generally in the transversal direction, the detectors being arranged to detect light rays with different angular directions, representing different sensitivity directions; means for producing a reference beam of coherent light which is at least partly coherent with the object beam; means for combining the reference beam with the reflected object beam from the surface to produce a cross interference in the speckle pattern providing information about the relative motion of the surface and the interferometer; means for detecting the speckle pattern and the cross interference pattern with the detectors; means for determining which detector in the array has zero or minimum sensitivity to the total velocity $V_{tot}$ of the motion, thereby identifying the detector with a sensitivity direction line that is normal to $V_{tot}$; means for monitoring the temporal change in which of the detectors has zero or minimum sensitivity, thereby ascertaining the change in direction of $V_{tot}$ over time, brought about by changes in $V_1$; and means for determining temporal changes in $V_1$.

The invention also extends to a method for the production of a seismic survey report, using the method and/or apparatus set out above, and also to a report produced in this way.

The particles at the surface will respond both to P-wave and S-wave stimulation and so their movements will be representative of the two waves. Since these movements are detected from a distance, the disadvantages of the prior art are avoided with there being no need to make contact with the surface and therefore no need to disengage before repositioning the detecting apparatus.

Preferably, the object beam and reference beam emanate from the interferometer. The interferometer may be moving constantly in the transversal direction and the surface may be moving intermittently, relatively, in a direction which may be other than the transversal direction.

Preferably, the coherent light beams are laser beams. Preferably, the object beam is expanded to illuminate the object under investigation.

The measurement position may be a point or a line on the surface of the object under investigation. Each detector in the array preferably consists of a line of detectors extending generally parallel to or generally at right angles to the transversal direction. The detectors may take the form of a full field detector array. Preferably, the light beams are subjected to imaging by imaging optics immediately prior to being detected by the detectors. The imaging optics may comprise a lens system or curved mirrors.

Preferably, each detector element comprises a line of individual detectors, and preferably, the line is in parallel with or transverse to the transversal detector line and the detectors comprise a full field detector array. The interferometer may include imaging optics in front of the line of detectors; the imaging optics comprises an imaging lens, a lens system or curved mirrors.

There may be several interferometers which are used simultaneously at different locations. Preferably, the response is transformed to and recorded in digital form. Preferably, the analysing step comprises analysing surface particle displacements and/or velocities and/or accelerations.

The z-component of the surface particle velocity in a subsea application is similar to the pressure component which will be measured with a mounted hydrophone on the monitoring device. This redundant measurement can be used to calibrate the system and make it more robust against ambient noise and system noise. An equivalent arrangement can be used on land.

The specular reflection scattered from the earth's surface is the contribution of many scattered wavelets which have a constant relative phase determined by the optical path-length from each point on the surface. Combining the reflected light with the coherent reference beam creates a complex interference pattern as a result of the difference in optical path length in reflections from the surface. An initial imaging processing step, where the interference pattern is subtracted from a known reference image, reveals the temporal progression of the 3-D particle displacement as a result of the seismic event. Furthermore, the signal to noise ratio may be improved by choosing multiple reference images to reduce speckle decorrelation effects. A final image processing step produces absolute intensity signal of the change in optical path as a result of the 3-D particle displacement. Finally, the intensity signal is then subjected to signal processing steps which recover the seismic S-wave signals in question.

Due to the relative movement between surface and the interferometer, the speckle pattern seen by the light detector may change within the seismic time. When the instrument is moving, the speckle pattern moves very fast and therefore the speckle monitoring must be carried out much more often than every 1 ms to be able to detect/recognise and therefore monitor the same speckle group every ms.

Due to the seismic wavelengths, the particle velocity may be in phase within a 5 m disc on the surface. Therefore groups of spatially distributed instruments can be used to increase signal to noise ratio in one seismic recording channel.

The invention is particularly suitable for marine seismics, in which the earth's surface is the sea bed, the seismic event is applied to the sea or directly to the sea bed and the interferometer is spaced above the sea bed. Preferably, the interferometer is located from 1 to 15 metres above the sea floor during the response period and may additionally include a hydrophone to record P-waves separately. However, the invention is also applicable to land applications where the terrain or conditions prevailing are difficult. In such a case, the interferometer is spaced above the land surface.

The instrument may be towed, eg. as a streamer or series of streamers behind a surface or submarine vessel or a land vehicle or an aircraft. Thus, there may be a plurality of interferometers mounted on a plurality of cables, the instruments on each cable preferably being spaced from each other by a distance which is less than the wavelength of the transmitted seismic event to prevent spatial aliasing of the recorded wavefield. Alternatively, the instrument(s) may be located on a self-propelled submarine vessel land vehicles or aircraft. In such an arrangement, the vehicle, vessel or aircraft is preferably unmanned and would preferably include an rf transmitter/receiver and aerial, an acoustic modem, an acoustic housing sensor, a bottom sensor, a depth sensor and an acoustic tracking system, in addition to the interferometer. In either case, the analysing step should include the elimination from the detected response of noise representing disturbances caused by the motion of the interferometer.

This motion can be measured by three independent accelerometers and then subtracted from the relative motion measured by the instrument.

Preferably, the particles whose movements are detected are sand particles on the sea floor or land.

Preferably, the seismic event comprises a seismic wave having a wavelength in the range 5 to 100 m and a duration from 2 ms to 1000 ms. Depending upon the depth of the exploration target and the seismic P and S-velocities, preferably, the response period is from 5 to 20 seconds. The seismic event may be generated using apparatus on a surface marine vessel. It may be generated at the surface or below the surface of the ocean. The event may be generated at the sea bed by seismic sources using the land seismic source principles, in which case P and S-waves can be generated. Alternatively, it may be generated on land in any known way.

The interferometer is preferably moving during the transmission period at a speed in the range 1 to 5 m/s, more preferably 3 to 4 m/s. The sampling rate is preferably 1/ms or 2/ms.

Clearly, since the interferometer will be moving in the water while recording, an unwanted dynamic component is added (towing noise). Parts of this noise can be separated from the recording by standard temporal and spatial filters. The noise which falls inside the frequency band of the particle velocity has to be calculated/predicted before it can be removed.

Relative movement in the vessels/vehicles/aircraft/cables can be partly predicted/eliminated by processing data from several interferometers which at the same time, but from different places more or less record the same part of the wavefront. This can be achieved with an instrument separation less than a wavelength of the seismic wave. If the resolution in the recording is good enough, relative positioning of the instruments can be derived by image analysis and the towing noise can be predicted as a result.

The ocean bottom movie recorders (OBM's) may be towed in a similar geometry as the marine multi-streamer spread used for pure P-wave seismic acquisition, but at a depth as close as possible to the sea bottom or land surface.

BRIEF DESCRIPTION OF THE DRAWINGS

The embodiments of the present invention may be more completely understood in consideration of the following detailed description of various embodiments in connection with the accompanying drawings, in which.

Figure 1:
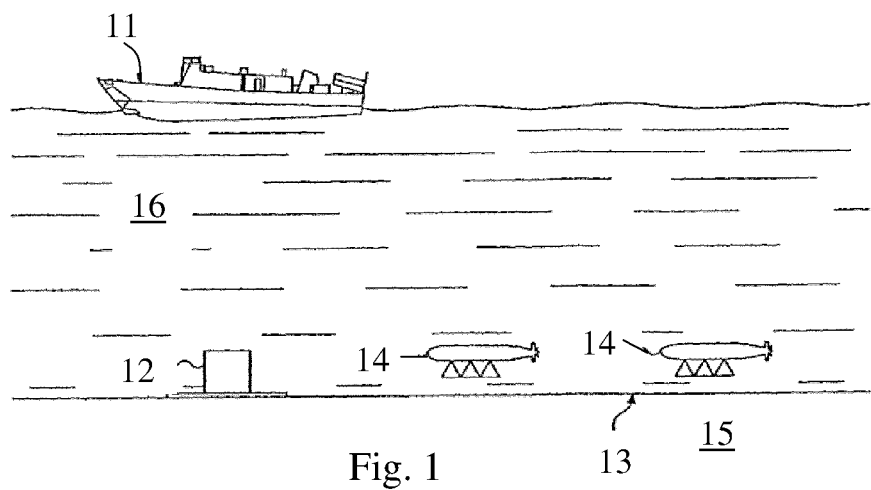
FIG. 1 is a schematic diagram of the overall system used in a marine application.

While the present invention is amenable to various modifications and alternative forms, specifies thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Referring to FIG. 1, the operation is controlled by a surface vessel 11. A seismic source 12 is located on the seabed 13 and a series of mobile instrument units 14 (of which two are shown) monitor the response at the seabed 13 to a seismic wave generated by the source 12. The instrument units 14 are positioned about a meter above the seabed 13.

The instrument units 14 each include an interferometer constituted by a light transmitter and a receiver, a hydrophone, an accelerometer and a processing unit. Its operation will be described below.

The hydrophone is present to measure seismic P-waves above the sea bottom 13. The accelerometer measures instrument oscillations in the 0-200 Hz range.

The processing unit serves to filter noise from the measurements taken, to recognise and detect image objects, to measure image object values and convert those values to particle velocities.

In use, the source 12 generates a seismic wave with a response which lasts for a period of 5 to 20 seconds which propagates through the bedrock 15 as P- and S-waves. The initial seismic wave is reflected and/or refracted at various stratum boundaries and the returning P- and S-waves cause oscillations in the up to 200 Hz range at the sea bottom 13 whose surface includes mud, sand and rocks. The interferometers 14 monitor the response at the sea bottom 13 effectively by applying light to the bottom 13 and recording the reflected light (ie. the cameras 14 film the bottom 13) at a sampling rate of 1 ns to 4 ms but generally <1 ms. In effect, this constitutes a movie of the particles on the sea bottom 13 as they move in response to the returning P- and S-waves.

The returning P-wave also progresses from the seabed 13 up through the water 16 and is detected by the hydrophone, at a sampling rate of 1 to 4 ms and this data is conveyed to the processing unit. The accelerometer conveys noise data corresponding to oscillations to the processing unit.

The processing unit analyses the data collected from the receiver, the hydrophone and the accelerometer and produces a record of the response of the sea bottom particles, compensated for movement of the instrument. This record can then be analysed using standard principles for seismic processing interpretation and characterization of structures, stratigrapic features and rock and fluid parameters.

Thus for each seismic shot from the source 12, all interferometers 14 simultaneously record the wavefield response at the sea bottom 13 in 2 to 4 ms samples. The instruments 14 carry out a preprocessing step which includes noise reduction, resolution enhancement, and image object identification. The camera unit dynamics are calculated and removed from the samples. Then $V_x$, $V_y$ and $V_z$ (the three velocity components of the S-wave) and P (the pressure from the P-wave) are derived and stored on four seismic traces. This is repeated each 2 to 4 ms.

In an alternative embodiment, the seismic source is not at a fixed location on the seabed, but is in fact a moving P-wave source which may for example be located on the vessel 11. The P-wave generated travels through the water 16 and into the bedrock 15 where it propagates and is reflected/refracted as P- and S-waves as before.

Figure 2:
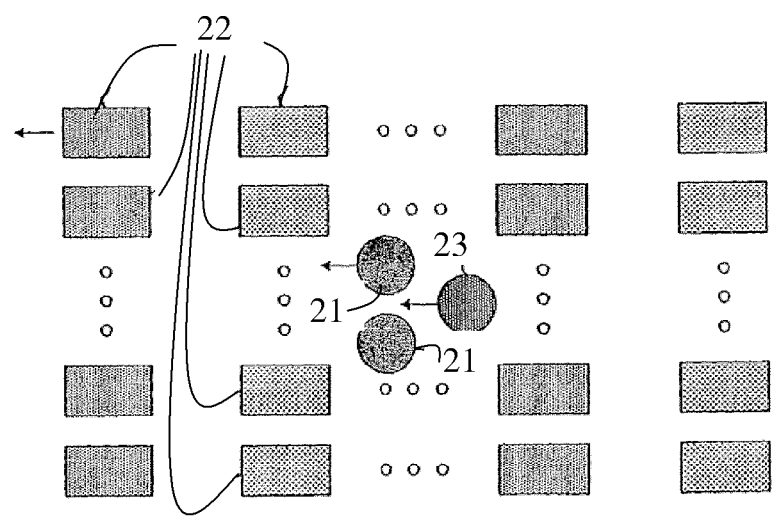
FIGS. 2, 3 and 4 are schematic plan views of three different data acquisition schemes.

FIG. 2 shows an arrangement in which the seismic source 21 is moving, and which includes an array of interferometers 22 which is moving and also a seismic receiver 23 which is moving. Four instruments are shown in each array though there could be a greater number. An ideal arrangement would include 1 to 3 sources at a spacing of 50 to 400 m. The seismic receiver 23 is spaced from the sources also by a distance of 25 to 400 m and records for 5 to 20 seconds (depending on the transmission period) at a sampling rate of 1/ms to 4/ms. The interferometers 22 and seismic receiver 23 move at a speed of 1 to 5 M/s. The bottom source is fixed while the floating, towed source is moving. The seismic receiver is the centre where all measurements are stored, where the steering is controlled, where energy can be distributed from, and where the operators are housed. This is similar to a seismic vessel which tows a seismic source and receivers today, and which would record/store the seismic information.

Figure 3:
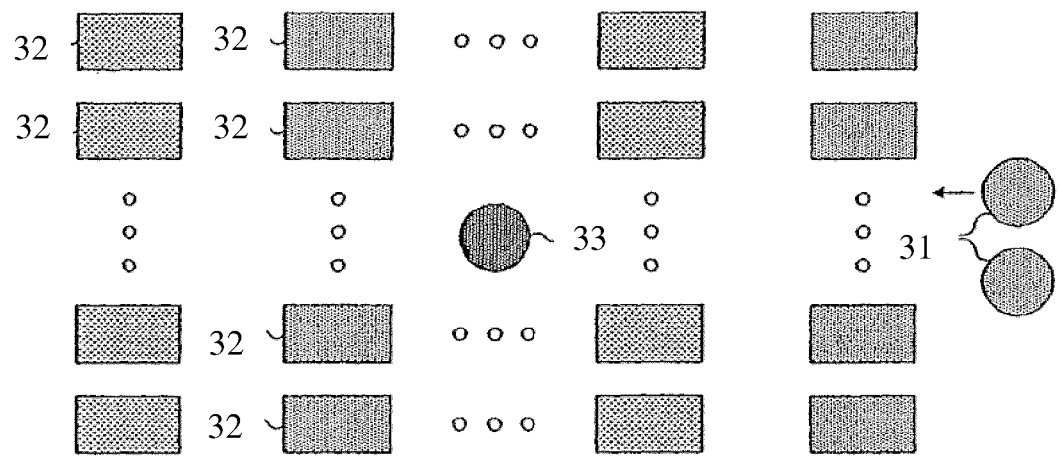

FIG. 3 shows an alternative arrangement in which the sources 31, optimally 1 to 3 in number, are moveable at a speed of 1 to 5 m/s, while the interferometers 32 and seismic receivers 33 are fixed. The spacings are similar to those in the previous arrangement.

Figure 4:
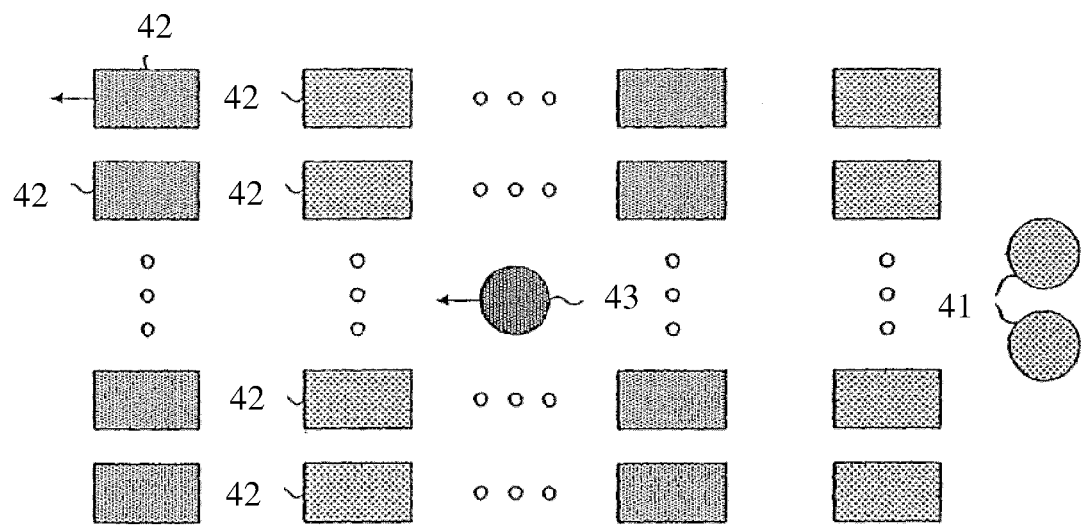

FIG. 4 shows a third arrangement, corresponding to FIG. 1, in which the sources 41 (again optimally 1 to 3 in number) are fixed, while the interferometers 42 and the seismic receiver 43 are moveable. The spacings and speeds are as for the first arrangement.

The instruments would normally be mounted on or connected to cables which are towed behind a vessel or by a dedicated submarine propulsion device. The position of the instruments relative to the seabed is determined by acoustic techniques and the cables are steered by "wings" on the cables. Vertical forces on the cables are balanced by weights or ballast. The cables provide mechanical connection between an array of instruments and also provide energy and communication connections. In a typical arrangement there are several cables, each towing an array of instruments.

The vessel or towing device includes navigation equipment and data storage, though the instruments also have data storage.

Alternatively, the connection between the instruments may be wireless eg. a radio connection either instead of or in addition to the cables.

Figure 5:
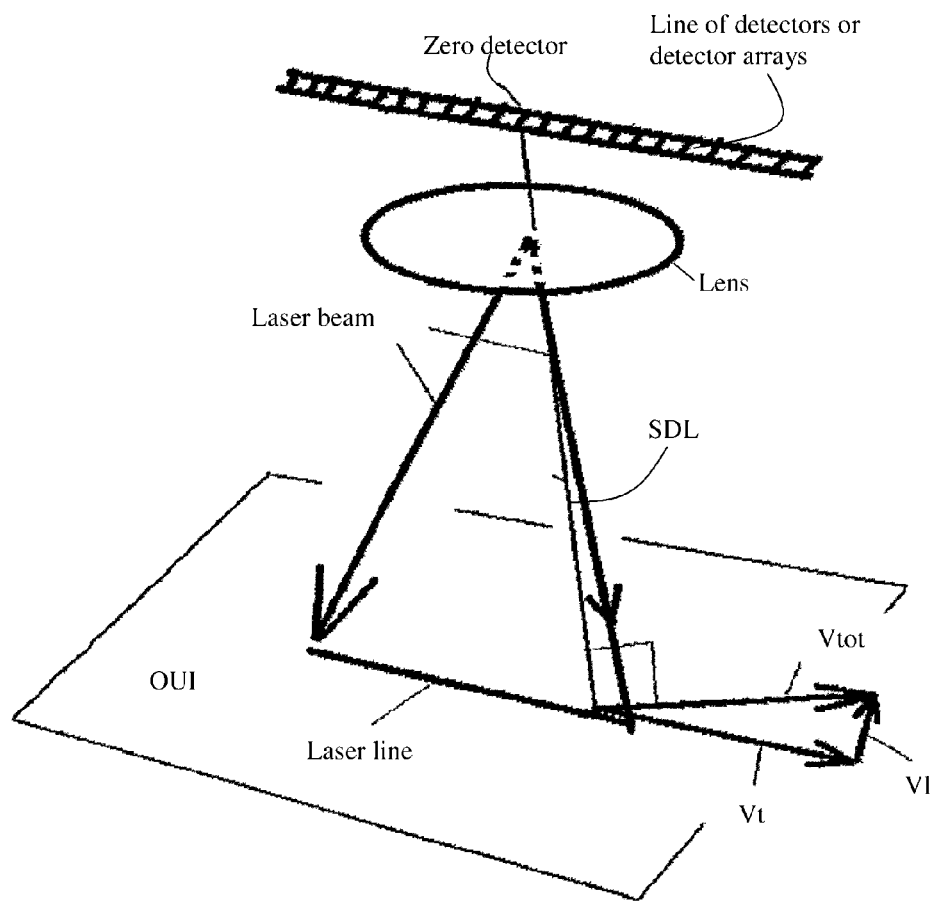
FIG. 5 is a schematic view showing the general principles of the invention.

Referring to FIG. 5, a laser beam is expanded to illuminate the object under investigation (OUI) along a line as shown in FIG. 5. The OUI can be the sea floor or other objects, like the surface of a rotating machine part.

There is a relative movement between the measurement position which may be a point, but here is a line on the surface of the OUI and the interferometer (optical head). The relative movement has a transversal velocity component $V_t$ as shown in FIG. 1, and also a longitudinal velocity component $V_1$. In a real measurement situation, it can be the OUI which is moving or it can be the interferometer which is moving, or both. For simplicity, this movement is described as if it is the OUI which is moving only. It is assumed that the velocity components are the same or approximately the same for all points along the laser line on the object. The laser line will normally have a limited length (from millimeter to meter) or in special applications it can be continuous over large distances.

Primarily, the invention is used to detect temporal variations (AC levels) of the longitudinal velocity component $V_1$. Depending on the direction of the laser beams and the directions of the OUI oscillations (wave), the $V_1$ can have component both out of the plane and into the OUI surface. The OUI can be a flat or a curved surface.

A line of detector elements is arranged basically in the same direction as the transversal velocity component $V_t$, as shown in FIG. 5. Each detector element can also be replaced with a detector array or transversal detector line, which allows averaging over several detector elements for each position on the detector line in FIG. 5. Alternatively, a whole full field detector array can be used. The detector elements or detector arrays are also illuminated by one or more reference beams, which are at least partly coherent with the object light reflected from the OUI (the reference beams are not shown in FIG. 5). In front of the line of detectors, there is an imaging lens or lens system or other imaging optics like e.g. curved mirrors. The imaging optics images the laser line on the OUI onto the line of detectors.

Instead of a laser line on the object surface, there can be a scanning laser point which is scanned along a similar line on the object. We can also illuminate a whole field on the object surface, preferably if a full field detector array is used so that the illuminated part of the object is imaged onto the detector array.

The laser beam which is illuminating the OUI can also be converging or diverging with focus at different distances from the source, including points below or beyond the OUI. But preferably, the laser, source for the object illumination is located in, or close to the aperture of the lens in FIG. 5. This means that illumination and observation directions are parallel. The laser beams can be pointing in different angular directions towards the OUI.

Changes in the longitudinal velocity component $V_1$ mean that the direction of the total velocity $V_{tot}$ will change. With this invention, we detect temporal changes in the direction of $V_{tot}$, and hence, temporal changes in the longitudinal velocity component $V_1$.

Each detector element in the interferometer, located at a specific location along the line of detectors or in the detector array, has its own specific sensitivity direction. The line SDL in FIG. 5 represents a line or direction like this. The interferometer and the laser beam is located and arranged with angular directions so that at least one detector or a group of detectors has a sensitivity direction line SDL which is normal to the velocity $V_{tot}$. If a full field detector array is used together with a full field object illumination, there will be a line of detectors across the array which all have a sensitivity direction normal to the velocity $V_{tot}$.

A detector element with a sensitivity line SDL which is normal to the velocity $V_{tot}$ will have no sensitivity to the velocity $V_{tot}$. All other detector elements with other sensitivity directions will pick up a smaller or larger part of the velocity $V_{tot}$.

Each detector element in the interferometer detects the interference between the object light and the reference light, and the intensity on a detector element is given by the equation:

$$I = I_{ref} + I_{obj} + 2 \cdot \mu \cdot \sqrt{I_{ref} \cdot I_{obj}} \cdot \cos(\alpha_{diff} + \alpha_{disp}) \quad (1)$$

where I is the total light intensity on the detector element
$I_{ref}$ is the reference light intensity
$I_{obj}$ is the object light intensity
μ is a factor between 0 and 1, and depends on the coherence of the light etc.
$\alpha_{diff}$ is the initial optical phase difference between the object- and reference light
$\alpha_{displ}$ is the additional optical phase difference due to object displacements
Equation (1) can also be written as $$I = I_{back} + I_{mod} \cdot \cos(\alpha_{diff} + \alpha_{disp}) \quad (2)$$

where $I_{back}$ is the background level
$I_{mod}$ is the modulation level

When we have a movement with a velocity $V_{tot}$ as shown in FIG. 5, the phase $\alpha_{displ}$ for a given detector element will be running with a phase velocity ω, depending on the angle between the sensitivity direction line SDL for this detector element and the direction of the velocity $V_{tot}$. If this angle is equal to, or very close to 90 degrees for a particular detector element, then the phase $\alpha_{displ}$ for this detector element will not be running, or it will change very little or very slowly. For other detector elements with other sensitivity directions, the phase $\alpha_{displ}$ will be running, and $\alpha_{displ}$ will be running faster as the SDL line deviates more and more from 90 degrees to the direction of the velocity $V_{tot}$.

As seen from equation (2), the intensity I at a detector will be modulated sinusoidally when the phase $\alpha_{displ}$ is running with time. This means that detectors with sensitivity directions (SDL) 90 degrees or close to 90 degrees to the direction of the velocity $V_{tot}$ will have intensities which are modulated slowly compared to detectors with other sensitivity directions. In the following we call the detectors with sensitivity direction SDL 90 degrees to the velocity $V_{tot}$ for zero detectors. Normally, the zero detector(s) change position all the time, so that different detectors along the line of detectors or within the detector array will be identified as zero detectors as time runs.

The main principle of this invention is to detect and locate zero detectors, that is, to locate detector positions with relatively slow variations in intensity I. This can for example be done in one of the following ways:

1. By sampling the detectors or detector arrays with fast sampling frequencies, and calculating the difference in signal from previous samples. If we call the electrical or digital signal from the detector S, we will have that $$S(t) = K \cdot I(t) \quad (3)$$

where S is signal from detector (electric or digital)
K is a constant
t is time
I is intensity on the detector
Now, looking at the temporal frequency of the signal S, we will find that the detector(s) with the lowest frequency of S represent the zero detector(s).

Figure 6:
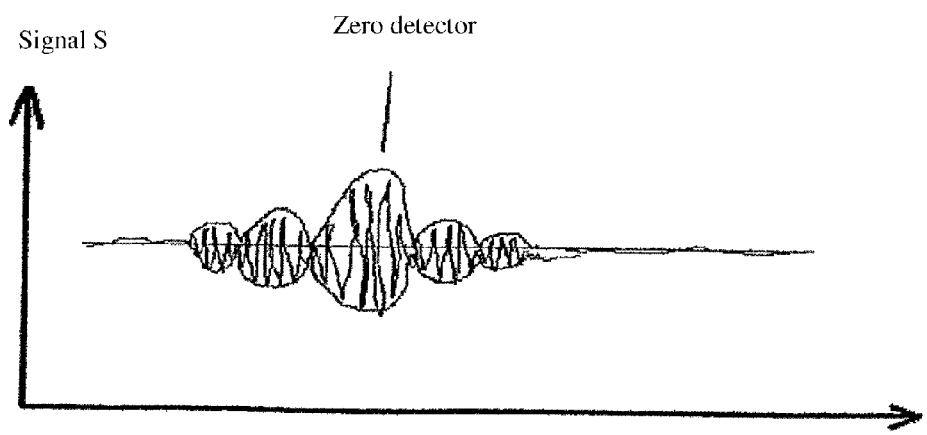
FIG. 6 is a graphical depiction of one way the received signals may appear along a line of detectors.

2. By using detectors with relatively slow sampling frequency and relatively long exposure period per sample. This way, detectors with an intensity fluctuation faster than the detector can resolve in time, will give no, or relatively low fluctuation of the signal S (low amplitude), since the intensity fluctuations will be averaged away. In other words, the signal S can not follow the fast modulation of the intensity L FIG. 6 shows an example on how the signal may look along a line of detectors. The frequency of the signal S increases by increasing distance from the zero detector at the same time as the signal S decrease in amplitude in accordance to a sine function as shown in FIG. 6. Equation (3) is not valid for this method, except for detector elements close to the zero detector, as the intensity fluctuation for these detectors will be slow enough for the detectors to resolve. The zero detector can be identified and located both by a spatial filtering along the line of detectors (see FIG. 6), and by analysis of the temporal fluctuations.

3. By a method which combines the above mentioned methods, where both the temporal frequency of the detectors are analysed as well as the signal amplitudes.

Figure 7:
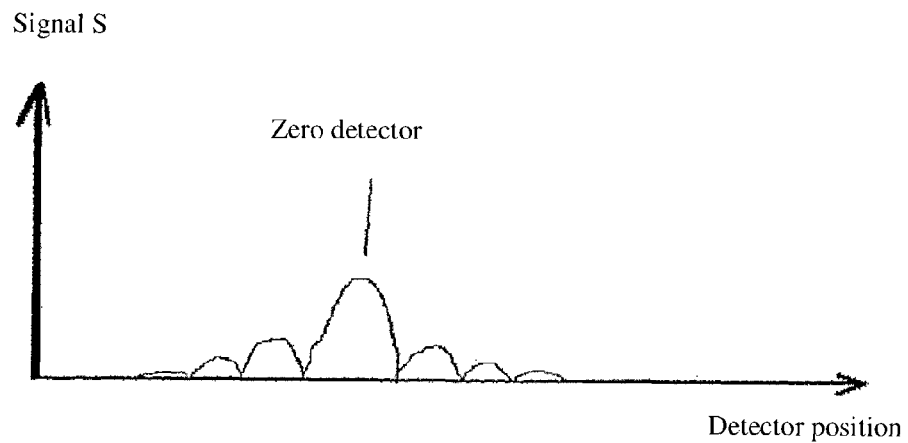
FIG. 7 is a modified form of the curve shown in FIG. 6.

The object light reflected from the OUI will generally have a speckle nature because of the surface roughness of the OUI and the high coherence properties of the laser light. This is also seen in the curve in FIG. 6. When the interferometer is moving relatively to the OUI or vice versa, the speckles will generally decorrelate in space as a result of the movement, and both I.sub.obj and .alpha..sub.diff in equation (3) will be changing with time. These random changes will give intensity fluctuations as seen from the equation, but these random intensity fluctuations will normally be more slow than the intensity changes due to the relative object movement V.sub..tot, at least for detectors away from the zero detectors. The random fluctuations mentioned above may be used to obtain averaging effects, leading to a more smooth intensity curve, see FIG. 7, where we have also filtered and rectified the signal. The averaging effects can be obtained both by averaging signals from several neighbouring detector elements or detector arrays, or the averaging can be obtained by averaging in the time domain. The averaging or smoothing effect may make it more easy to detect and locate the exact position of the zero detectors. If the curve in FIG. 7 is sampled at several or many points along the detector line, an algorithm to calculate the "center of gravity" (=zero detector) can be used. The speed of the decorrelation of I.sub.obj and .alpha..sub.diff is dependent on the shape, size and focus of the laser beam.

Figure 8:
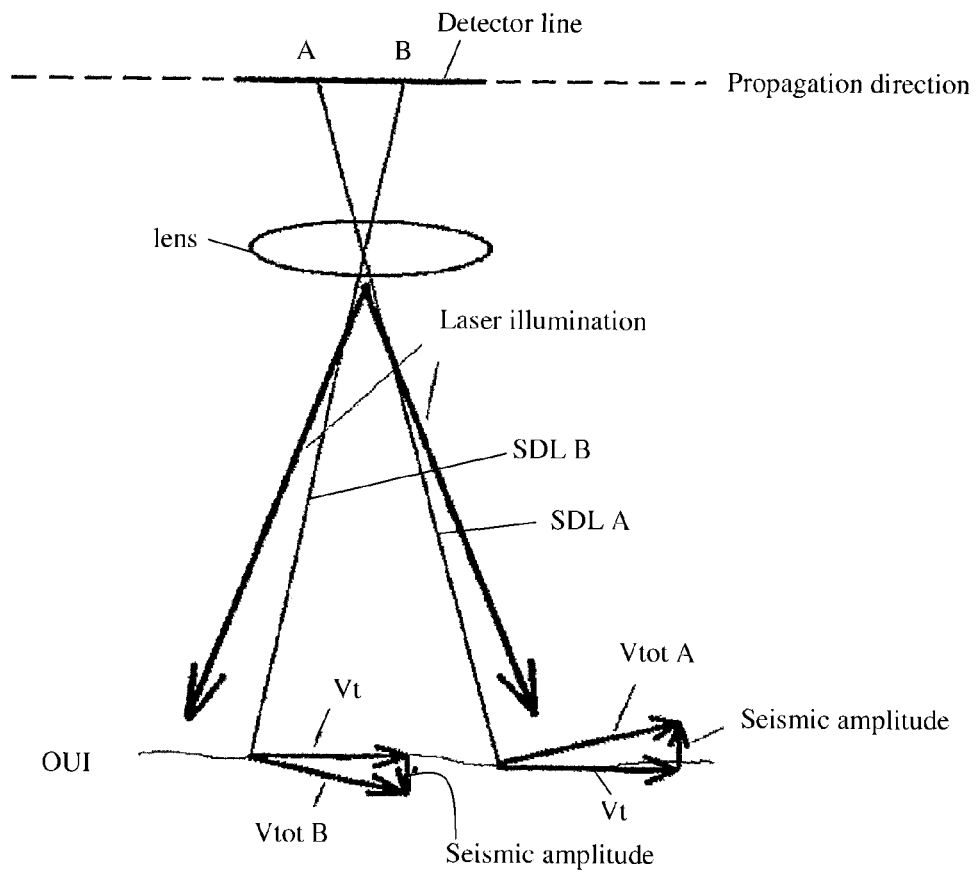
FIG. 8 is a view similar to FIG. 5, showing the invention applied to the detection of seismic signals at the sea floor.

FIG. 8 shows schematically how the invention works for the detection of seismic signals at the sea floor. The interferometer is moving along the dotted line, and the total (relative) velocity of the measurement point which is moving across the sea floor is varying between vector $V_{totA}$ and vector $V_{totB}$ in the figure as long as we have a single frequency, steady state seismic signal with amplitude as indicated in the figure. The zero detector will go between position A and B on the line of detectors. If the transversal velocity $V_t$ is 1 m/s and the seismic amplitude is 100 nanometer at 50 Hz, then the longitudinal velocity amplitude will be 31.4 micrometer/s, and the direction of the total velocity $V_{tot}$ will vary with +/−0.0018 degrees. With the interferometer located 5 meters above the sea floor and with a length of the laser line on the OUI of 0.3 meter, and a detector array length of 50 mm, then the distance between the position A and B on the line of detectors will be approximately 26 micrometer, which is typically 4 pixel distances with a 7 micrometer pixel size.

An example on a recording algorithm for the detection of the zero detector may be as follows: 1. The signal S.sub.i(t) is acquired from all the detector-elements i along the line of detectors with a given sampling frequency (t=time) 2. The variation of $S_i(t)$ with time $\partial S_i(t)/\partial t$ is calculated for all pixels 3. $\partial S_i(t)/\partial t$ is summarized and averaged over some time for all pixels, and may be also averaged over several neighbouring pixels. Some of these neighbouring pixels may also be located in the transversal direction. 4. A spatial filtering is performed along the line of detectors, to find the position of the zero detector(s)

Other algorithms can also be used, where the time evaluation of the signal S along the line of detectors is being used to locate the zero detector(s).

The invention can also use 1-dimensional "position sensitive detectors" to resolve small variations of intensity movements (small movements of the zero detectors). A position sensitive detector can be based on coupling or correlation techniques between several neighbouring detector elements, and the sensitivity can be increased this way.

To image a 30 cm laser line on the object onto a 50 mm detector line at a 5 meter distance, a focal length of appr. 0.7 meter can be used. The optical distance between the lens and the detector line will be relatively large, but mirrors or other optical elements can be used to obtain a folded light path with smaller overall dimensions, see FIG. 9.

The sensitivity of the system can also be increased or decreased by using different lenses or lens systems or other imaging elements in front of the detectors. Curved mirrors can also be used. We can also have combined systems with 2 or more lines of detectors side by side, where one system can have different lens systems in front of the detectors, while the other lines of detectors have a different lens or imaging system. This way, one detector system can have a high sensitivity, while the other system has lower sensitivity but larger dynamics range with respect to seismic amplitudes and with respect to misalignment of the whole interferometer and laser beam direction compared to the velocity direction $V_{tot}$. In a practical design, the lenses or imaging elements may be long in one direction and narrow in the other transversal direction.

Figure 9:
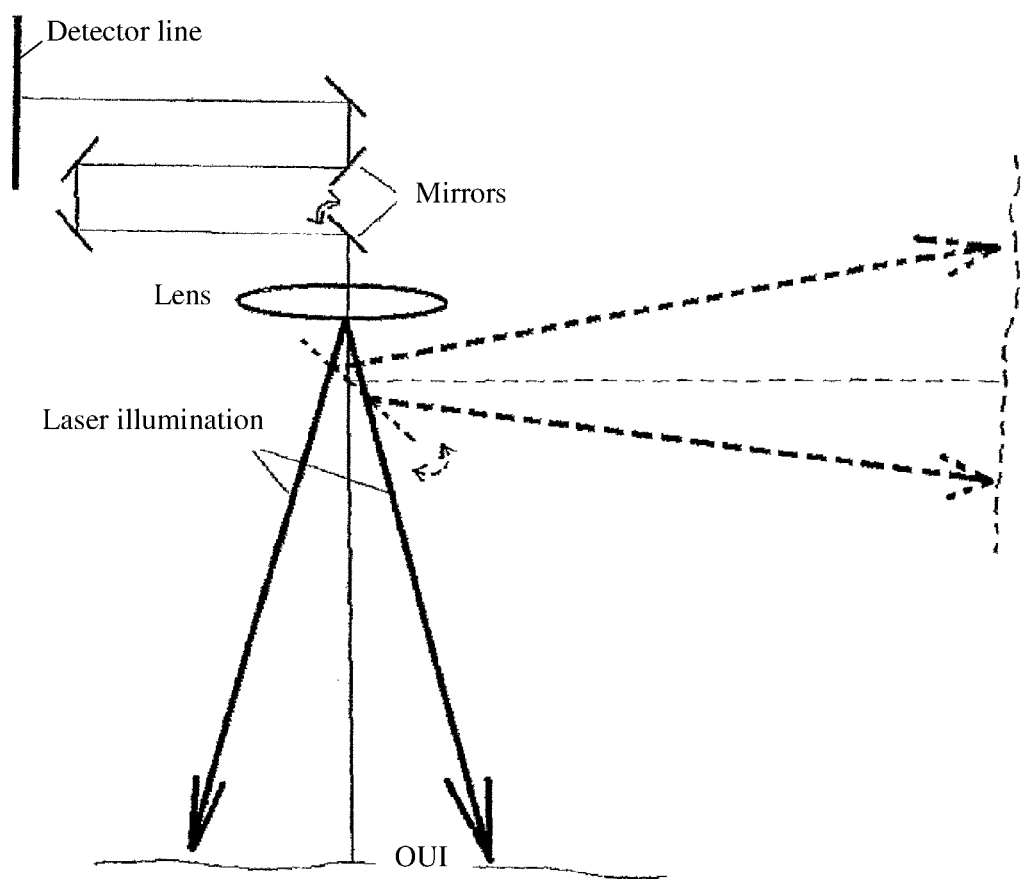
FIG. 9 shows the use of optical elements to modify the system.

If mirrors are mounted between the imaging system and the detectors, or on the outside of the imaging system, then the sensitivity direction lines for the detector elements will be adjusted by tilting one or more of these mirrors as indicated in FIG. 9. If the interferometer is moving with an angular position which vary with time, then it may be required to adjust the sensitivity directions accordingly.

The line of detectors or detector arrays or position sensitive detectors can be short or long, it may be from a few micrometer to several meters if several laser beams and imaging systems are (preferably) being used.

If two or several parallel detector lines with different sensitivity are used, the least sensitive detector line system (with highest dynamic range) can be used to adjust the sensitivity direction for other detector lines with higher sensitivity, so they can find their respective zero detectors and operate within its limited dynamic range.

The invention can also use a dynamic steering of the sensitivity directions by using a dynamic steering of the mirrors mentioned earlier. The steering of the mirrors is controlled by feedback signals from one or more parallel lines of detectors as described above, so that the zero detector position is kept more or less constant at the detector line, in one or more of the detector lines being used. This way, the steering feedback signal will give information on the seismic signal.

The measurement of seismic signals may have a duration of several seconds, starting with relatively high seismic amplitudes and then with decreasing amplitudes. The dynamic range and the sensitivity of this invention may be adjusted and changed during the measurement period. This can be done by using two or more parallel lines of detectors, or by changing or adjusting optical elements in front of a line of detectors.

Figure 10:
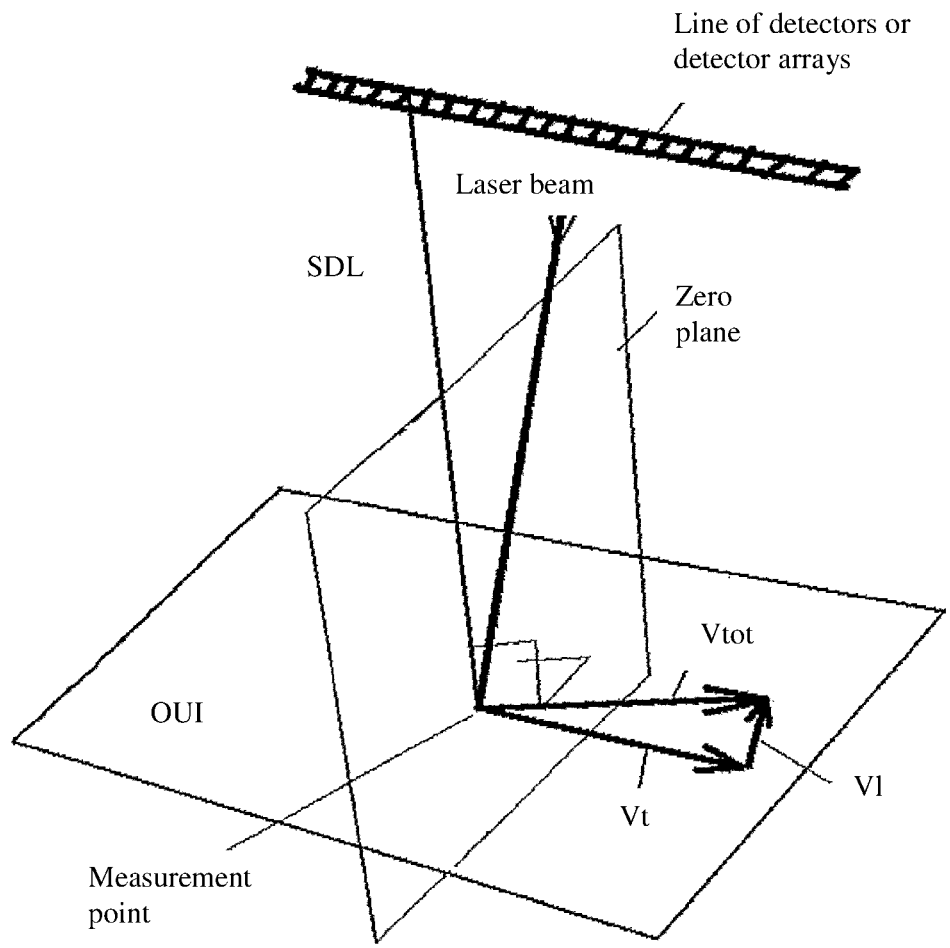
FIG. 10 shows an alternative embodiment.

Another design of the invention is shown in FIG. 10.

In this case, a laser beam is directed toward the object under investigation (OUI) to illuminate a single point on the surface (measurement point in FIG. 10). The laser beam can be converging or diverging with its focus at different distances from the source, including points below or beyond the OUI. The beam can also have different shapes (circular, rectangular etc.) and the beam can also be focused towards a line below the surface instead of a point.

A line of detector elements is arranged basically in the same direction as the transversal velocity component $V_t$, as shown in FIG. 10. As before, each detector element can be replaced with a detector array. The detector elements or detector arrays are also illuminated by one or more reference beams, which are at least partly coherent with the object light reflected from the OUI (the reference beams are not shown in FIG. 10). The light reflected from the measurement point on the OUI can also be reflected by mirrors or guided by other elements or by other means, so that the line of detectors or detector arrays can be physically located and geometrically arranged in other ways than shown in FIG. 10.

In FIG. 10, the zero plane is shown. This is the plane in space which goes through the measurement point and which is normal to the velocity vector $V_{tot}$. As before, each detector element, located at a specific location along the line of detectors, has its own specific sensitivity direction. The line SDL in FIG. 10 represents a line or direction like this.

Figure 11:
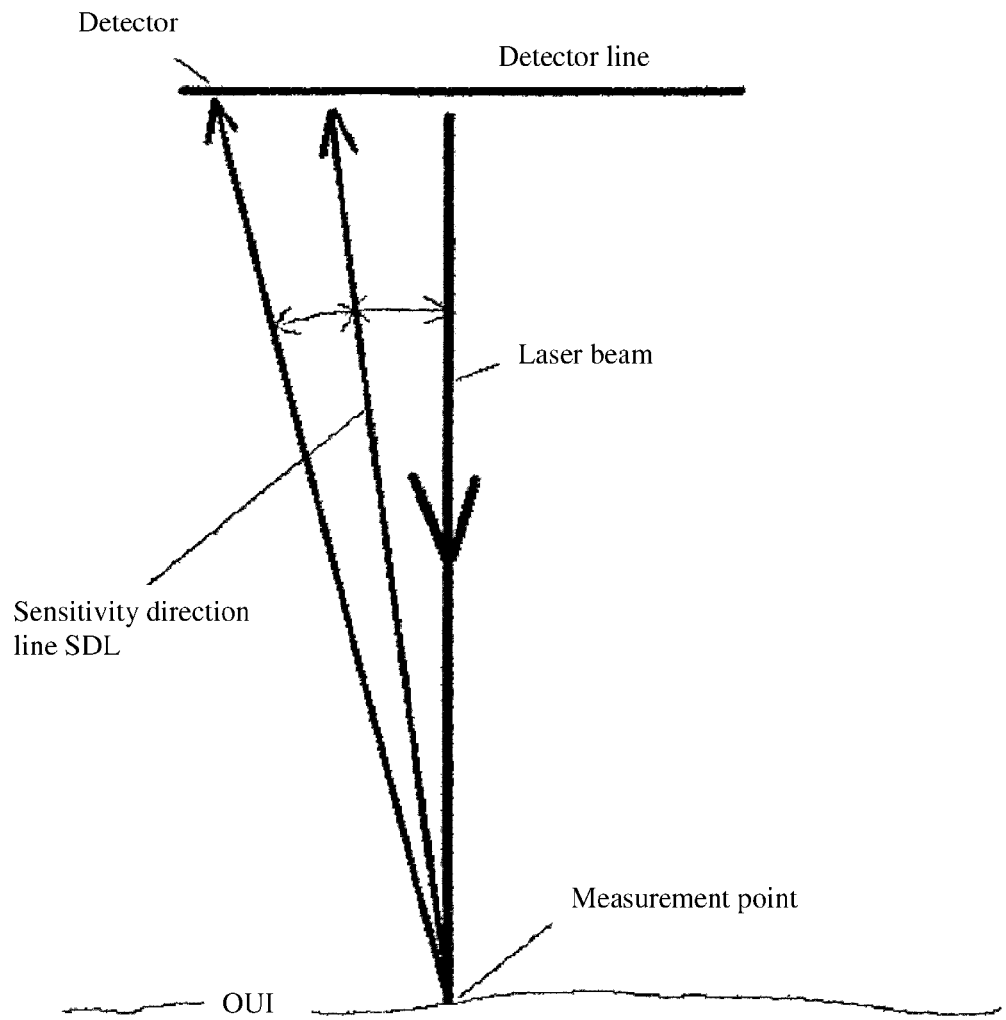
FIG. 11 shows more specifically the sensitivity line for a detector.

The interferometer and the laser beam are located and arranged with angular directions so that at least one detector or detector array on the detector line has a sensitivity direction line SDL which is parallel to and actually located in the zero plane. With the arrangement shown in FIG. 10, the sensitivity direction for a detector element is not the line which goes from the measurement point (laser spot on OUI) and toward the detector element. The sensitivity direction for a detector element is shown in FIG. 11.

A detector element with a sensitivity line SDL in the zero plane will have no sensitivity to the velocity $V_{tot}$, but all other detector elements with other sensitivity directions will pick up a smaller or larger part of the velocity $V_{tot}$.

The equation for the light intensity is the same for this optical configuration as for the former configuration, so equations (1) and (2) are still valid.

Figure 12:
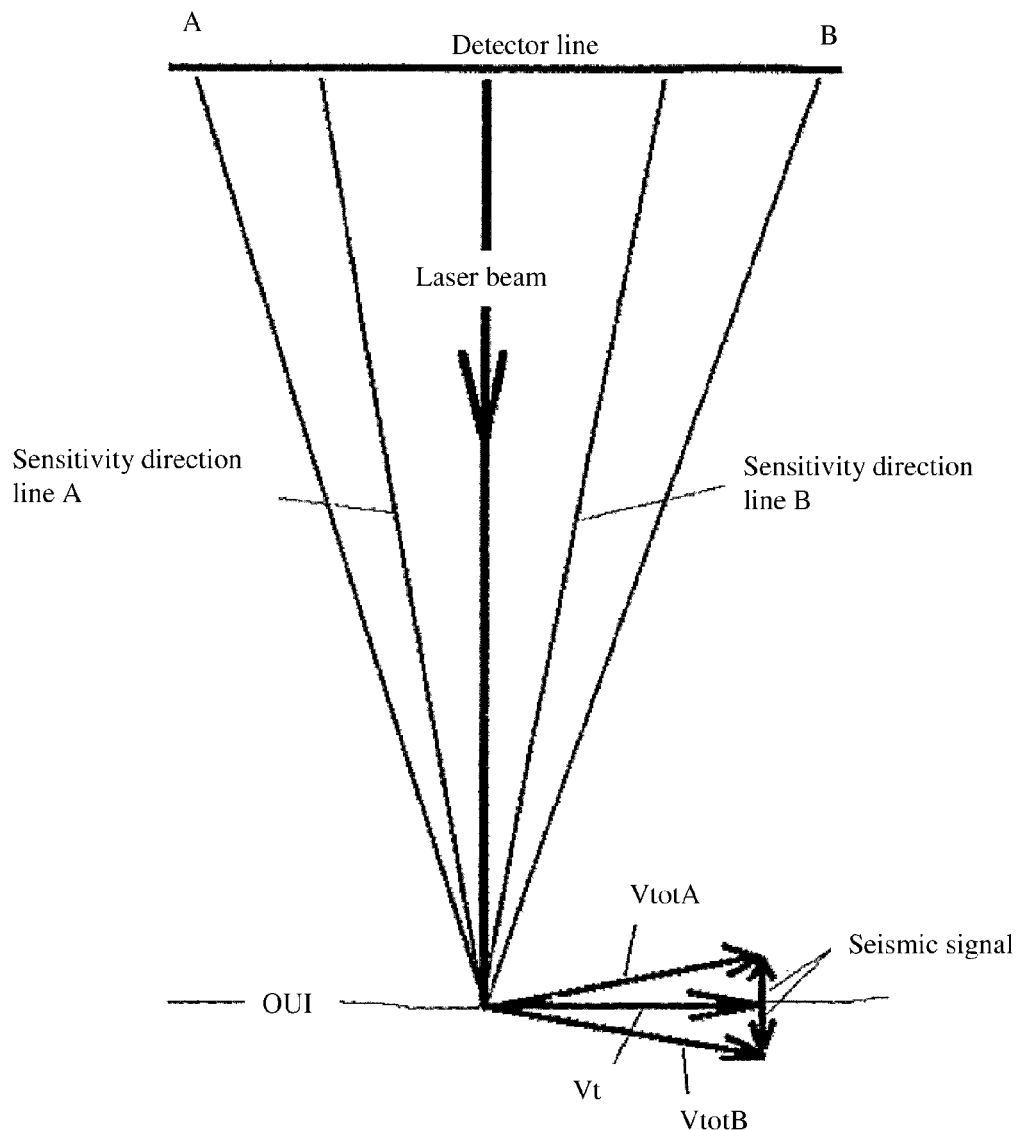
FIG. 12 shows more specifically the detection of seismic signals at the sea floor.

FIG. 12 shows schematically how the invention works for the detection of seismic signals at the sea floor. The total (relative) velocity of the measurement point which is moving across the sea floor is varying between vector $V_{totA}$ and vector $V_{totB}$ in the figure as long as we have a single frequency steady state seismic signal with amplitude as indicated in the figure. The zero detector will go between position A and B on the line of detectors. If the transversal velocity $V_t$ is 1 m/s and the seismic amplitude is 100 nanometer at 50 Hz, then the longitudinal velocity amplitude will be 31.4 micrometer/s, and the direction of the total velocity $V_{tot}$ will vary with +/−0.0018 degrees. If the interferometer is located 5 meters above the sea floor, the distance between the position A and B on the line of detectors will be 314 micrometer, which is typically 40 pixel distances with a 7 micrometer pixel size.

Also with this optical configuration, we can use "position sensitive detectors" to resolve small variations of intensity movements (small movements of the zero detectors). The main difference between this configuration and the first configuration, is that no imaging optics are used, and that the line of detector elements will normally be longer.

Figure 13:
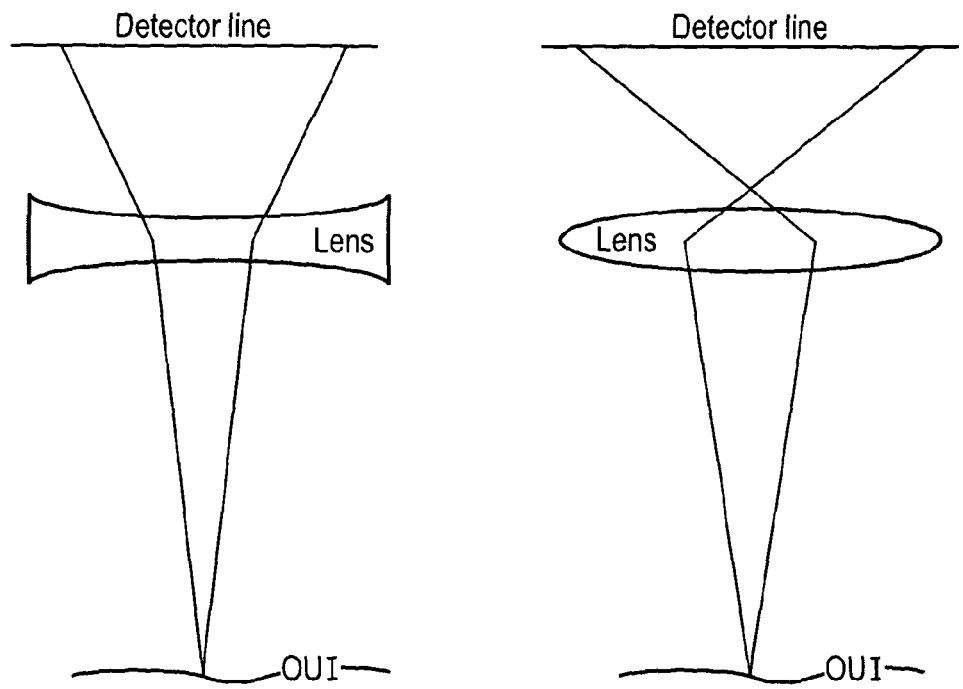
FIG. 13 shows two alternative lens configurations for use in the invention.

However, the sensitivity of this second configuration can also be increased or decreased by using negative or positive lenses or lens systems or other imaging elements in front of the detectors, as shown in FIG. 13. Curved mirrors can also be used. Also in this case, we can also have combined systems with 2 or more lines of detectors side by side, where one system can have different lens systems (or no lenses) in front of the detectors, while the other lines of detectors have a different lens or imaging system.

As before, the line of detectors or detector arrays or position sensitive detectors can be short or long; it may be from a few micrometers to several meters or even continuous along distances of several hundred meters, if several laser beams are (preferably) being used. If the length of the detector line is limited, the zero detector position may end up outside the line of detector arrays, so no detector element along the line becomes the zero detector. In this case, the direction of the laser beam can be adjusted until the zero detector position is brought within the range (length) of the line of detector elements. In addition, if the light coming towards the line of detectors is reflected via mirrors before it reaches the detectors, these mirrors can be tilted to obtain a proper sensitivity direction for the system.

With this second configuration, a dynamic steering of the laser beam is possible, where the steering of the beam is controlled by feedback signals from one or more parallel lines of detectors as described above, so that the zero detector position is kept more or less constant at the detector line, in one or more of the detector lines being used. As before, the steering feedback signal will give information on the seismic signal. The laser beam is preferably being controlled in one direction only, basically in the same direction as the velocity $V_{tot}$ which again, is normally the same direction, or nearly the same direction as the line of detectors.

Generally, unlike the system described earlier with reference to FIG. 5, the system in FIG. 10 will have higher sensitivity but smaller dynamic range with increasing distance to the OUI. The distance to the OUI can be found by the system using the data S from the line of detectors, as the zero detector area will be wider with increasing distance.

A disadvantage with the second configuration compared to the first one is that changes in the distance between the interferometer and the OUI may give false signals along the detector line. These false signals may be small, but if the system is arranged to resolve very small amplitudes, this error source may be a limiting factor.

Phase Modulation

Figure 14:
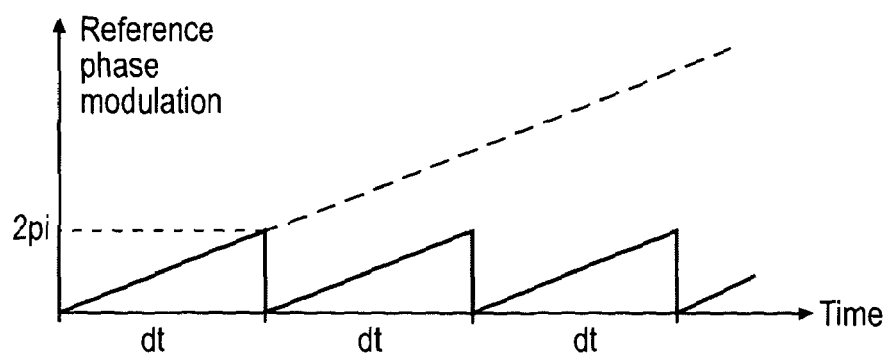
FIG. 14 shows the use of phase modulation of the reference beam to compensate for movement of the interferometer.

If the laser beam and the sensitivity directions of the system (both the first and the second configuration) pick up a large part of the movement of the interferometer or the OUI, then phase modulation of the reference beam can be used to compensate for this, see FIG. 14. This is described in GB-A-2411001.

If a relatively large part of the movement of the interferometer is picked up by the system, this means that the velocity $V_1$ gets large, so that $V_1$ may have a large constant ("DC") component with a small "AC" component on top of it. The large DC component of $V_1$ can be removed by using phase modulation of the reference beam. Phase modulation actually means that we move the curve in FIG. 7 sideways (left or right) on the detector line. Another way to express this, is by saying that the ankle between the zero line or zero plane and the total velocity $V_{tot}$ becomes different from 90 degrees when phase modulation of the reference is used.

If, for instance, the laser beam is directed with an angle forward or backward relative to the propagation direction for the interferometer (with reference to FIG. 8 and FIG. 12), then the velocity $V_1$ will get a smaller or larger "DC" level. In this case, phase modulation can be used to compensate for this.

Using phase modulation, we put a "synthetic" longitudinal velocity on the system. If we simulate a sinusoidally varying velocity $V_1$ with given amplitude and frequency, and if we find the corresponding zero detector "amplitude" along the detector line at this same frequency, then we can actually calculate the transversal velocity $V_t$ from this data.

3-Dimensional Measurement

Figure 15:
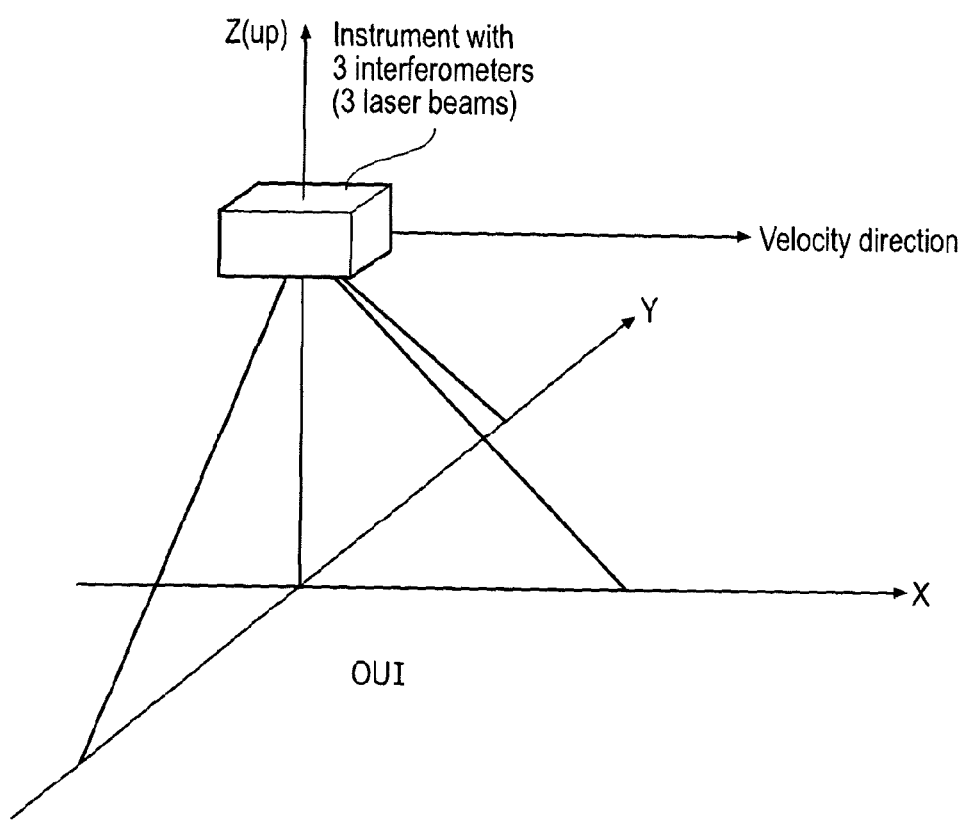
FIG. 15 shows the application of the invention to 3-dimensional measurement.

The invention can be used to measure spatial 3-dimensional displacements if for example three separate units like the ones in FIG. 5 and/or in FIG. 10 are being used. FIG. 15 shows an example of this, where the seismic signals in the sea floor are measured in 3 dimensions. Each of the laser beams in the figure can be a laser beam or a laser line as described earlier. With the arrangement shown in FIG. 15, phase modulation would be required in the unit pointing forward in the velocity directions.

It is assumed that the wavelength of the OUI oscillations (waves) are larger than the distance between the positions on the OUI where the sensitivity lines in the laser beam impinge.

If we have a large number of systems like that shown in FIG. 15, moving in a large array of systems, we can carry out measurements over larger areas of the sea floor. We can also use combined systems, where light reflected from the same illumination line or illumination point can be picked up by different neighbouring detector systems, to obtain measurements with different sensitivity directions.

The invention claimed is:

1. A method of seismic exploration comprising the steps of:
   a) generating a seismic event;
   b) applying the seismic event to an earth's surface;
   c) detecting a response to the seismic event, using an interferometer, in which there is a relative motion between the earth's surface and the interferometer, the detected response including P-waves and S-waves in the earth's surface; and
   d) analyzing the detected response; wherein:
   the detecting step comprises the step of monitoring and recording the response to the seismic event in the form of movements of particles at the earth's surface, from a position spaced from the earth's surface, the detecting step being carried out over a response period, the response period being a predetermined period of time after the seismic event;
   the analyzing step comprises the step of analyzing the movements of particles at the earth's surface in the recorded response to the seismic event during the response period;
   the relative motion having a total velocity V0 which includes a transversal or traversing component Vt and a longitudinal component V1; and
   using the interferometer in step (c) of detecting a response to the seismic event includes the steps of:
   i) directing an object beam of coherent light to a measurement position at the earth's surface, there being relative motion between the surface and the measurement position;
   ii) arranging an array of detectors on the interferometer in a transversal detection line extending generally in the transversal direction, the detectors being arranged to detect light rays with different angular directions, representing different sensitivity directions;

iii) producing a reference beam of coherent light which is at least partly coherent with the object beam;
iv) combining the reference beam with the reflected object beam from the surface to produce a cross interference in a speckle pattern providing information about the relative motion between the surface and the interferometer;
v) detecting the speckle pattern and a cross interference pattern with the detectors;
vi) determining which detector in the array has zero or minimum sensitivity to the total velocity V0 of the motion, thereby identifying the detector with a sensitivity direction line that is normal to V0;
vii) monitoring the temporal change in which of the detectors has zero or minimum sensitivity, thereby ascertaining the change in direction of V0 over time, brought about by changes in V1; and
viii) determining temporal changes in V1.

2. The method of claim 1, wherein the object beam and the reference beam emanate from the interferometer.

3. The method of claim 1, wherein the interferometer is moving constantly in a transversal direction and the surface is moving intermittently, relatively, in a direction other than the transversal direction.

4. The method of claim 1, wherein the coherent light beams are laser beams.

5. The method of claim 1, wherein the object beam is expanded to illuminate an object under investigation.

6. The method of claim 5, wherein the measurement position is a point or a line on a surface of the object under investigation.

7. The method of claim 1, wherein each detector in the array consists of a line of detectors extending generally parallel to or generally at right angles to the transversal direction.

8. The method of claim 1, wherein the detectors take a form of a full field detector array.

9. The method of claim 1, wherein the lightbeams are subjected to imaging by imaging optics immediately prior to being detected by the detectors.

10. The method of claim 9, wherein the imaging optics comprise a lens system or curved mirrors.

11. The method of claim 1, wherein each detector element comprises a line of individual detectors.

12. The method of claim 1, wherein the line of individual detectors is parallel with or transverse to the transversal detector line and the detectors comprise a full field detector array.

13. The method of claim 1, wherein the interferometer includes imaging optics in front of the transversal detector line, imaging optics comprising an imaging lens, a lens system or curved mirrors.

14. The method of claim 1, wherein several interferometers are used simultaneously at different locations.

15. The method of claim 1, wherein the response is transformed to and recorded in digital form.

16. The method of claim 1, wherein the analyzing step comprises the step of analyzing surface particle displacements, velocities, or accelerations.

17. The method of claim 1, wherein a particle velocity is in phase within a 5 m disk on the surface.

18. The method of claim 1, wherein groups of spatially distributed instruments are used to increase a signal to noise ratio in one seismic recording channel.

19. The method of claim 1, wherein the earth's surface is a seabed, the seismic event is applied to a sea or directly to the seabed, and the interferometer is spaced above the seabed.

20. The method of claim 19, wherein the interferometer is located approximately 1 meter to approximately 15 meters above the seafloor during the response period.

21. The method of claim 20, wherein the interferometer includes a hydrophone to record P-waves separately.

22. The method of claim 1, wherein the instrument is towed as a streamer or series of streamers behind a surface or a submarine vessel or a land vehicle or an aircraft.

23. The method of claim 22, wherein a plurality of interferometers is mounted on a plurality of cables.

24. The method of claim 23, wherein the instruments on each cable are spaced from each other by a distance which is less than the wavelength of the transmitted seismic event.

25. The method of claim 22, wherein the analyzing step includes the elimination from the detected response of noise representing disturbances caused by a motion of the interferometer.

26. The method of claim 25, wherein the motion of the interferometer is measured by three independent accelerometers and subtracted from the relative motion measured by the instrument.

27. The method of claim 1, wherein the instrument is located on a self propelled submarine vessel, land vehicle, or aircraft.

28. The method of claim 25, wherein the vehicle, vessel, or aircraft is unmanned.

29. The method of claim 27, wherein the vehicle, vessel, or aircraft includes an RF transmitter/receiver and aerial, an acoustic modem, an acoustic housing sensor, a bottom sensor, a depth sensor, an acoustic tracking system, and the interferometer.

30. The method of claim 1, wherein the particles whose movements are detected are sand particles on the sea floor or land.

31. The method of claim 1, wherein the seismic event comprises a seismic wave having a wave length of approximately 5 m to approximately 100 m and a duration between approximately 2 ms and approximately 1000 ms.

32. The apparatus of claim 31, wherein the interferometer further includes a hydrophone to record P waves separately.

33. The method of claim 1, wherein the response period is between approximately 5 second and approximately 20 seconds.

34. The method of claim 1, wherein the seismic event is generated using an apparatus on a surface marine vessel.

35. The method of claim 34, wherein the seismic event is generated at or below a surface of the ocean.

36. The method of claim 34, wherein the seismic event is generated at a seabed by seismic sources using land seismic source principles.

37. The method of claim 1, wherein the interferometer is moving during a transmission period at a speed of approximately 1 m/s to approximately 5 m/s.

38. The method of claim 37, wherein the speed is approximately 3 m/s.

39. The method of claim 1, wherein a sampling rate is between approximately 1 sample/ms to approximately 2 samples/ms.

40. The method of claim 1, further comprising the step of producing a seismic survey report of a region.

41. An apparatus for carrying out seismic exploration comprising:
   a) means for generating a seismic event;
   b) means for applying the seismic event to an earth's surface;
   c) an interferometer for detecting a response to the event including P-waves and S-waves in the earth's surface where there is a relative motion between the earth's surface and the interferometer; and d) means for analyzing the detected response; wherein:

the interferometer is arranged to monitor and record the response to the seismic event in a form of movements of particles at the earth's surface, from a position spaced from the earth's surface, over a predetermined response period after the seismic event;

the relative motion has a total velocity $V0$ which includes a transversal or traversing component $Vt$ and a longitudinal component $V1$, and (c) the interferometer for detecting a response to the event comprises:

i) means for directing an object beam of coherent light to a measurement position at the earth's surface, there being relative motion between the surface and the measurement position;

ii) an array of detectors on the interferometer arranged in a line extending generally in a transversal direction, the detectors being arranged to detect light rays with different angular directions, representing different sensitivity directions;

iii) means for producing a reference beam of coherent light which is at least partly coherent with the object beam;

iv) means for combining the reference beam with the reflected object beam from the surface to produce a cross interference in a speckle pattern providing information about the relative motion of the surface and the interferometer; means for detecting the speckle pattern and a cross interference pattern with the detectors;

v) means for determining which detector in the array has zero or minimum sensitivity to the total velocity $V0$ of the motion, thereby identifying the detector with a sensitivity direction line that is normal to $V0$;

vi) means for monitoring the temporal change in which of the detectors has zero or minimum sensitivity, thereby ascertaining a change in direction of $V0$ over time, brought about by changes in $V1$;

and vii) means for determining temporal changes in $V1$.

42. The apparatus of claim 41, wherein the means for directing an object beam of coherent light is a laser.

43. The apparatus of claim 41, wherein the detector is a line of detectors extending generally parallel to or generally at right angles to the transversal direction.

44. The apparatus of claim 41, wherein the interferometer includes imaging optics in front of the line of detectors.

45. The apparatus of claim 41, wherein the light beams are subjected to imaging by imaging optics immediately prior to being detected by the detectors and the imaging optics comprise an imaging lens, lens system, or curved mirrors.

46. The apparatus of claim 41, wherein a plurality of interferometers are used simultaneously at different locations.

47. The apparatus of claim 46, further comprising means to transform the response into digital form and means to record the digital form.

48. The apparatus of claim 41, wherein the earth's surface is a seabed, the seismic event is arranged to be applied to a sea or directly to the seabed, and the monitoring apparatus is arranged to be spaced above the seabed.

49. The apparatus of claim 41, wherein the interferometer is arranged to be towed by a vessel or is self-propelled.

50. The apparatus of claim 41, further comprising a plurality of interferometers mounted on a plurality of cables, and instruments on each cable being spaced from each other by a distance which is less than a wave length of the seismic event.

51. The apparatus of claim 41, further comprising means for producing a seismic survey report.

52. A method of producing a seismic survey report comprising:

a) generating a seismic event;

b) applying the seismic event to an earth's surface;

c) detecting a response to the seismic event, using an interferometer, in which there is a relative motion between the earth's surface and the interferometer, the detected response including P-waves and S-waves in the earth's surface;

d) analyzing the detected response; and e) generating a seismic survey report; wherein the detecting step comprises the step of monitoring and recording the response to the seismic event in the form of movements of particles at the earth's surface, from a position spaced from the earth's surface, the detecting step being carried out over a response period, the response period being a predetermined period of time after the seismic event;

the analyzing step comprises the step of analyzing the movements of particles at the earth's surface in the recorded response to the seismic event during the response period;

the relative motion having a total velocity $V0$ which includes a transversal or traversing component $Vt$ and a longitudinal component $V1$; and using the interferometer in step (c) of detecting a response to the seismic event includes the steps of:

i) directing an object beam of coherent light to a measurement position at the earth's surface, there being relative motion between the surface and the measurement position;

ii) arranging an array of detectors on the interferometer in a transversal detection line extending generally in the transversal direction, the detectors being arranged to detect light rays with different angular directions, representing different sensitivity directions;

iii) producing a reference beam of coherent light which is at least partly coherent with the object beam;

iv) combining the reference beam with the reflected object beam from the surface to produce a cross interference in a speckle pattern providing information about the relative motion between the surface and the interferometer;

v) detecting the speckle pattern and a cross interference pattern with the detectors;

vi) determining which detector in the array has zero or minimum sensitivity to the total velocity $V0$ of the motion, thereby identifying the detector with a sensitivity direction line that is normal to $V0$;

vii) monitoring the temporal change in which of the detectors has zero or minimum sensitivity, thereby ascertaining the change in direction of $V0$ over time, brought about by changes in $V1$; and vii) determining temporal changes in $V1$.

* * * * *

UNITED STATES PATENT AND TRADEMARK OFFICE
CERTIFICATE OF CORRECTION

PATENT NO. : 8,498,176 B2
APPLICATION NO. : 11/990558
DATED : July 30, 2013
INVENTOR(S) : Meldahl et al.

Page 1 of 1

It is certified that error appears in the above-identified patent and that said Letters Patent is hereby corrected as shown below:

In the Claims:

Column 14, line 57, after "interferometer" please insert --,--.

Column 14, line 57, after "in" please insert --the--.

Column 14, line 57, after "step" please delete "(c)".

Column 14, line 58, after "event" please insert --in the step (c),--.

Column 18, line 32, after "interferometer" please insert --,--.

Column 18, line 32, after "in" please insert --the--.

Column 18, line 32, after "step" please delete "(c)".

Column 18, line 33, after "event" please insert --in the step (c),--.

Signed and Sealed this
Fifth Day of November, 2013

Teresa Stanek Rea
*Deputy Director of the United States Patent and Trademark Office*